(12) United States Patent
Kim

(10) Patent No.: US 12,246,688 B2
(45) Date of Patent: Mar. 11, 2025

(54) BRAKE ACTUATOR

(71) Applicant: HL MANDO CORPORATION, Pyeongtaek-si (KR)

(72) Inventor: Kyung Won Kim, Seongnam-si (KR)

(73) Assignee: HL MANDO CORPORATION, Peongtaek-si (KR)

( * ) Notice: Subject to any disclaimer, the term of this patent is extended or adjusted under 35 U.S.C. 154(b) by 390 days.

(21) Appl. No.: 17/636,170

(22) PCT Filed: Aug. 19, 2020

(86) PCT No.: PCT/KR2020/011049
§ 371 (c)(1),
(2) Date: Feb. 17, 2022

(87) PCT Pub. No.: WO2021/045412
PCT Pub. Date: Mar. 11, 2021

(65) Prior Publication Data
US 2022/0297657 A1    Sep. 22, 2022

(30) Foreign Application Priority Data
Sep. 2, 2019  (KR) .................. 10-2019-0108112

(51) Int. Cl.
*B60T 13/74*  (2006.01)
*F16D 55/226*  (2006.01)
(Continued)

(52) U.S. Cl.
CPC .......... *B60T 13/741* (2013.01); *F16D 55/226* (2013.01); *F16D 65/183* (2013.01);
(Continued)

(58) Field of Classification Search
None
See application file for complete search history.

(56) References Cited

U.S. PATENT DOCUMENTS

2011/0232407 A1   9/2011  Verhagen et al.
2017/0356514 A1*  12/2017 Kim .................. F16H 25/2018
2019/0256072 A1*  8/2019  Hyeon ................ F16D 65/18

FOREIGN PATENT DOCUMENTS

KR  10-2006-0095247 A   8/2006
KR     20-0426314 Y1    9/2006
(Continued)

OTHER PUBLICATIONS

International Search Report (PCT/ISA/210) issued in PCT Application No. PCT/KR2020/011049 dated Nov. 17, 2020 with English Translation.
(Continued)

*Primary Examiner* — Melanie Torres Williams
(74) *Attorney, Agent, or Firm* — LEE, HONG, DEGERMAN, KANG & WAIMEY

(57) ABSTRACT

The present disclosure relates to a brake actuator. The brake actuator, which is configured to press or release a piston toward a brake pad and be controlled by an electrical signal, includes a power generating part provided to generate power by an electrical signal, a spindle member provided to rotate by receiving power from the power generating part and having a first screw portion formed on an outer circumferential surface, and a nut member provided to press or release the piston, the nut member having a second screw portion formed on an inner circumferential surface to be engaged with the first screw portion, wherein a size of a pitch between adjacent threads of the first screw portion is changed in a constant cycle along a rotation direction.

9 Claims, 12 Drawing Sheets

(51) Int. Cl.
*F16D 65/18* (2006.01)
*F16D 121/04* (2012.01)
*F16D 121/24* (2012.01)
*F16D 125/06* (2012.01)
*F16D 125/40* (2012.01)

(52) U.S. Cl.
CPC ...... *F16D 2121/04* (2013.01); *F16D 2121/24* (2013.01); *F16D 2125/06* (2013.01); *F16D 2125/40* (2013.01)

(56) References Cited

FOREIGN PATENT DOCUMENTS

| | | |
|---|---|---|
| KR | 10-2013-0066377 A | 6/2013 |
| KR | 101536598 B1 * | 7/2015 |
| KR | 10-2019-0099881 A | 8/2019 |

OTHER PUBLICATIONS

Written Opinion (PCT/ISA/237) issued in PCT Application No. PCT/KR2020/011049 dated Nov. 17, 2020.

* cited by examiner

<A SECTION>

<B SECTION>

BRAKE ACTUATOR

CROSS-REFERENCE OF RELATED APPLICATIONS

This application is the U.S. National Phase under 35 U.S.C. § 371 of International Patent Application No. PCT/KR2020/011049, filed on Aug. 19, 2020, which claims the benefit of Korean Patent Application No. 10-2019-0108112, filed on Sep. 2, 2019, the entire disclosures of each are incorporated by reference herein.

TECHNICAL FIELD

The present disclosure relates to a brake actuator, and more particularly, to a brake actuator capable of performing a precise control in an electronic caliper brake.

BACKGROUND ART

A brake system is essential to brake a vehicle, and recently, an electronic caliper brake for parking braking by employing a brake actuator in addition to a hydraulic disk brake has been proposed.

The electronic caliper brake includes a disk rotating with a wheel of a vehicle, a carrier on which a pair of pad plates are installed to be movable forward and backward so as to press the disc, a caliper housing slidably installed on the carrier, a cylinder provided in the caliper housing, a piston installed in the cylinder to be movable forward and backward by braking hydraulic pressure, a spindle member and a nut member for pressing the piston, and an actuator for transmitting a driving force to the spindle member.

Such an electronic caliper brake performs hydraulic braking by pressing the piston with the braking hydraulic pressure or performs parking braking by receiving a driving force from a power transmission part of the actuator and pressing the piston by a power conversion part.

Specifically, when a braking operation is performed by the actuator, a current supplied to the actuator is controlled. In this case, a conventional electronic caliper brake controls the current only for whether the actuator is operated or stopped.

DISCLOSURE

Technical Problem

The present disclosure is directed to providing a brake actuator capable of detecting a rotational speed or torque of a spindle member without a separate sensor during braking.

The present disclosure is directed to providing a brake actuator capable of performing a precise control without affecting assembling and productivity of the product by changing only a part of the structure of a spindle member or a nut member.

The present disclosure is directed to providing a brake actuator capable of improving efficiency by adjusting a supply current depending on a temperature condition of a power generating part or a motor.

Technical Solution

An aspect of the present disclosure provides a brake actuator, which is configured to press or release a piston toward a brake pad and be controlled by an electrical signal, including a power generating part provided to generate power by an electrical signal, a spindle member provided to rotate by receiving power from the power generating part and having a first screw portion formed on an outer circumferential surface, and a nut member provided to press or release the piston, the nut member having a second screw portion formed on an inner circumferential surface to be engaged with the first screw portion, wherein a size of a pitch between adjacent threads of the first screw portion is changed in a constant cycle along a rotation direction.

The size of the pitch between the adjacent threads of the first screw portion may be changed in a cycle of one rotation along the rotation direction.

The first screw portion may include a first pitch between the threads provided on one side and a second pitch between the threads provided on the other side, and a size (X+α) of the second pitch may be formed larger than a size (X) of the first pitch.

The first pitch may be formed on the opposite side of the second pitch with respect to a central axis of the spindle member.

A size of a pitch between adjacent threads of the second screw portion may be formed to be constant.

The nut member may include a rod having the second screw portion formed therein, and a head formed to extend radially from the rod and provided with an anti-rotation part corresponding to an anti-rotation surface of the piston.

Another aspect of the present disclosure provides a brake actuator, which is configured to press or release a piston toward a brake pad and be controlled by an electrical signal, including a power generating part provided to generate power by an electrical signal, a spindle member provided to rotate by receiving power from the power generating part and having a first screw portion formed on an outer circumferential surface, and a nut member provided to press or release the piston, the nut member having a second screw portion formed on an inner circumferential surface to be engaged with the first screw portion, wherein a size of a pitch between adjacent threads of the second screw portion is changed in a constant cycle along a rotation direction.

The size of the pitch between the adjacent threads of the second screw portion may be changed in a cycle of one rotation along the rotation direction.

The second screw portion may include a first pitch between the threads provided on one side and a second pitch between the threads provided on the other side, and a size (X+α) of the second pitch may be formed larger than a size (X) of the first pitch.

The first pitch may be formed on the opposite side of the second pitch with respect to a central axis of the nut member.

A size of a pitch between adjacent threads of the first screw portion may be formed to be constant.

The nut member may include a rod having the second screw portion formed therein, and a head formed to extend radially from the rod and provided with an anti-rotation part corresponding to an anti-rotation surface of the piston.

Another aspect of the present disclosure provides a brake actuator, which is configured to press or release a piston toward a brake pad and be controlled by an electrical signal, including a power generating part provided to generate power by an electrical signal, a spindle member provided to rotate by receiving power from the power generating part and having a first screw portion formed on an outer circumferential surface, and a nut member provided to press or release the piston, the nut member having a second screw portion formed on an inner circumferential surface to be engaged with the first screw portion, wherein the first screw portion includes a plurality of protrusions formed to protrude on grooves between threads in a constant cycle along a rotation direction.

The protrusions may be formed to protrude in a cycle of one rotation along the rotation direction.

A size of a pitch between the adjacent threads of the second screw portion may be formed to be constant.

The nut member may include a rod having the second screw portion formed therein, and a head formed to extend radially from the rod and provided with an anti-rotation part corresponding to an anti-rotation surface of the piston.

Another aspect of the present disclosure provides a brake actuator, which is configured to press or release a piston toward a brake pad and be controlled by an electrical signal, including a power generating part provided to generate power by an electrical signal, a spindle member provided to rotate by receiving power from the power generating part and having a first screw portion formed on an outer circumferential surface, and a nut member provided to press or release the piston, the nut member having a second screw portion formed on an inner circumferential surface to be engaged with the first screw portion, wherein the second screw portion includes a plurality of protrusions formed to protrude on grooves between threads in a constant cycle along a rotation direction.

The protrusions may be formed to protrude in a cycle of one rotation along the rotation direction.

A size of a pitch between the adjacent threads of the first screw portion may be formed to be constant.

The nut member may include a rod having the second screw portion formed therein, and a head formed to extend radially from the rod and provided with an anti-rotation part corresponding to an anti-rotation surface of the piston.

Advantageous Effects

A brake actuator according to an embodiment of the present disclosure can detect a rotational speed or torque of a spindle member without a separate sensor during braking.

The brake actuator according to an embodiment of the present disclosure can perform precise control without affecting assembling and productivity of the product by changing only a part of the structure of the spindle member or a nut member.

The brake actuator according to an embodiment of the present disclosure can improve efficiency by adjusting a supply current depending on a temperature condition of a power generating part or a motor.

MODE OF THE DISCLOSURE

Figure 1:
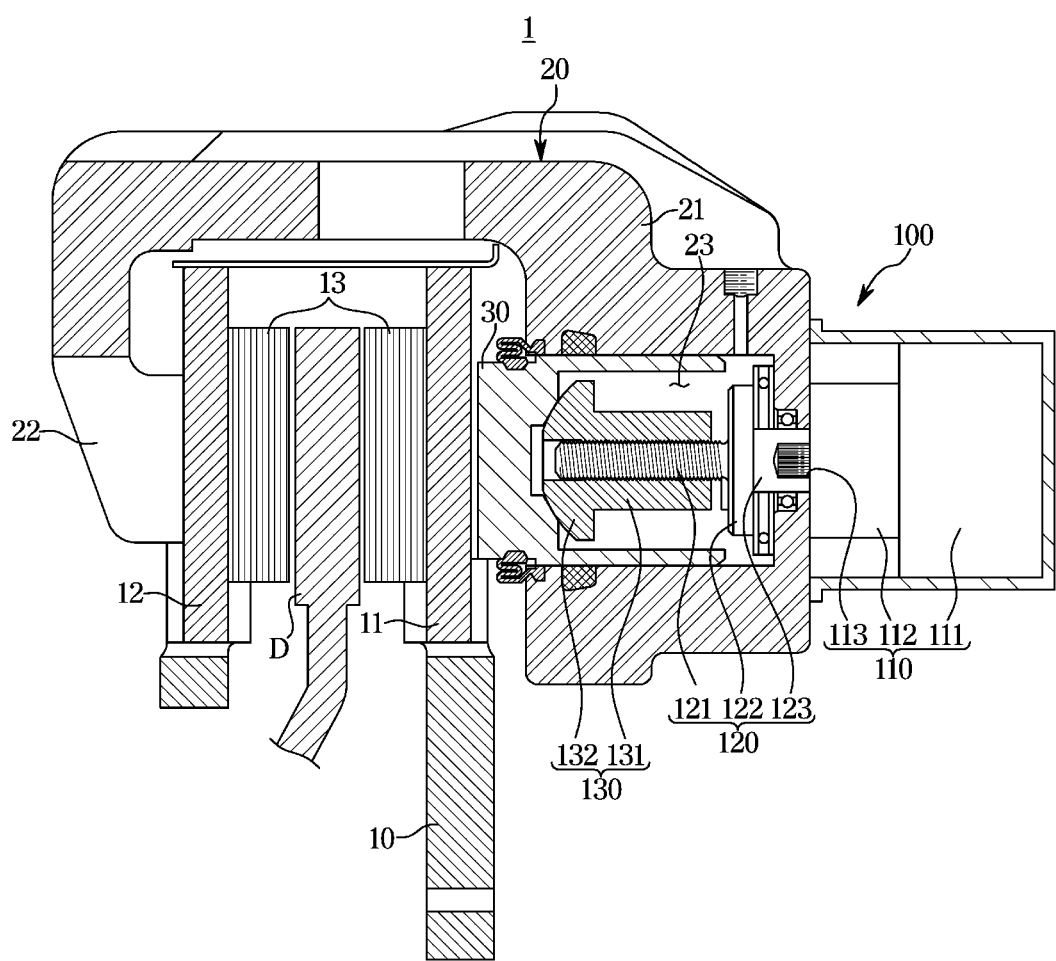
FIG. 1 is a schematic cross-sectional view of an electronic caliper brake according to a first embodiment of the present disclosure.

Hereinafter, embodiments of the present disclosure will be described in detail with reference to the accompanying drawings. The following embodiment is provided to fully convey the spirit of the present disclosure to a person having ordinary skill in the art to which the present disclosure belongs. The present disclosure is not limited to the embodiment shown herein but may be embodied in other forms. The drawings are not intended to limit the scope of the present disclosure in any way, and the size of components may be exaggerated for clarity of illustration. Throughout the specification, like reference numerals refer to like elements.

Figure 2:
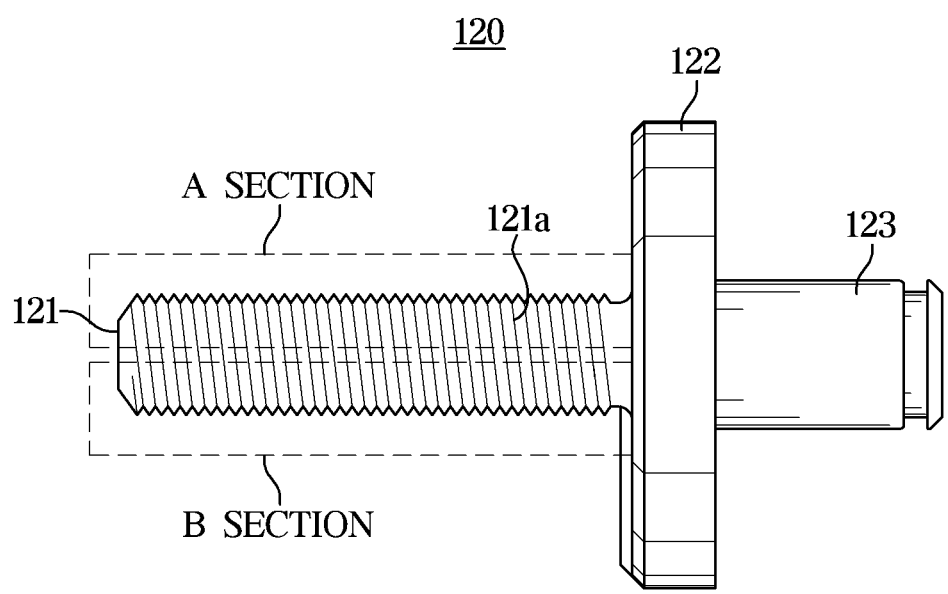
FIG. 2 is a cross-sectional view of a spindle member according to the first embodiment of the present disclosure.
Figure 3:
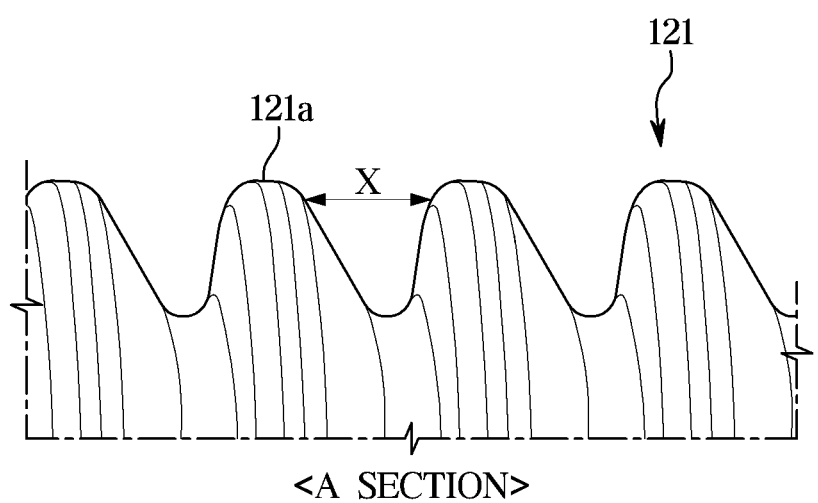
FIG. 3 is an enlarged cross-sectional view of part A in FIG. 2.
Figure 4:
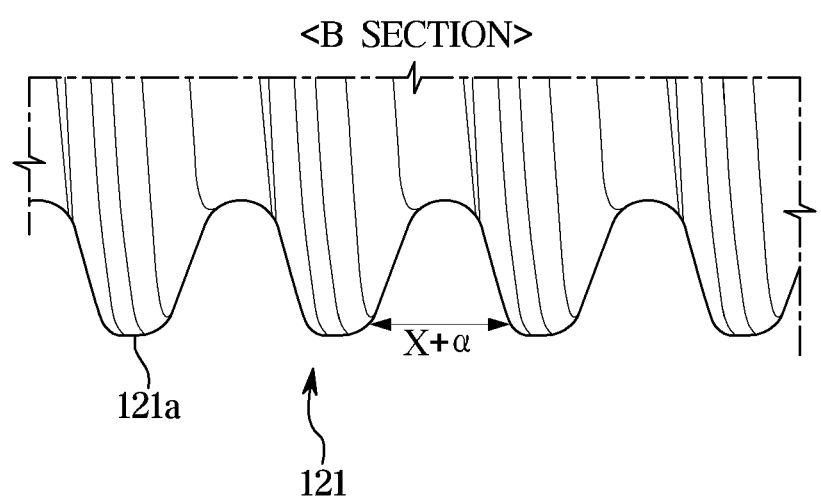
FIG. 4 is an enlarged cross-sectional view of part B in FIG. 2.

FIG. 1 is a schematic cross-sectional view of an electronic caliper brake according to a first embodiment of the present disclosure, FIG. 2 is a cross-sectional view of a spindle member according to the first embodiment of the present disclosure, FIG. 3 is an enlarged cross-sectional view of part A in FIG. 2, and FIG. 4 is an enlarged cross-sectional view of part B in FIG. 2.

Referring to FIGS. 1 to 4, an electronic caliper brake 1 according to an embodiment of the present disclosure includes a carrier 10 on which a pair of pad plates 11 and 12 is installed to be movable forward and backward so as to press a disk D rotating together with a wheel of a vehicle, a caliper housing 20 in which the carrier 10 is slidably installed and a cylinder 21 is provided, a hydraulic chamber 23 provided in the cylinder 21 and into which a brake oil is introduced to generate hydraulic pressure, a piston 30 installed to be movable forward and backward by the hydraulic pressure generated in the hydraulic chamber 23, and an actuator 100 provided to receive an electrical signal and transmit a rotational force to the piston 30 to press or release the piston 30 toward the pad plate 11.

The pair of pad plates 11 and 12 includes the inner pad plate 11 disposed in contact with the piston 30 and the outer pad plate 12 disposed in contact with a finger part 22 of the caliper housing 20, which will be described later. The pair of pad plates 11 and 12 are installed on the carrier 10 fixed to a vehicle body to move forward and backward toward opposite side surfaces of the disk D. A friction pad 13 is attached to one surface of each of the pad plates 11 and 12 facing the disk D.

The caliper housing 20 is slidably installed on the carrier 10. More specifically, the caliper housing 20 includes the cylinder 21 in which the actuator 100 is installed at a rear end thereof and the piston 30 is installed to move forward and backward therein, and the finger part 22 bent downward to actuate the outer pad plate 12 in front thereof.

The piston 30 is formed in a cylindrical shape with one side open to have a hollow inside and slidably inserted into the cylinder 21.

The piston 30 is provided such that an anti-rotation surface (not shown) of a shape corresponding to an anti-rotation part 132a of a nut member 130 is formed on an inner circumferential surface thereof to limit the rotation of the nut member 130.

The piston 30 receives the rotational force of the actuator 100 to press the inner pad plate 11 toward the disk D. At this time, the piston 30 moves forward toward the inner pad plate 11 to press the inner pad plate 11, and due to the reaction force, the caliper housing 20 operates in the opposite direction to the piston 30 so that the finger part 22 presses the outer pad plate 12 toward the disk D, thereby performing braking.

The actuator 100 includes a power generating part 110 provided to generate a rotational force by an electrical signal, a spindle member 120 provided to rotate by receiving power from the power generating part 110, and the nut member 130 provided to convert a rotational force of the spindle member 120 into a linear motion to press or release the piston 30 to the inner pad plate 11 side.

The power generating part 110 may include a motor 111 provided to generate power by an electrical signal, a reduction gear part 112 provided to amplify a torque while reducing the power of the motor 111, and a power shaft 113 provided to transmit the power of the reduction gear part 112.

One side of the spindle member 120 is connected to the power shaft 113 to receive the rotational force of the power generating part 110, and the other side thereof is screwed with the nut member 130 to convert the rotational force into the linear motion.

Specifically, a connection part 123 connected to the power shaft 113 to receive power is provided on one side of the spindle member 120, a rotation shaft 121 having a first screw portion 121a formed on an outer circumferential surface thereof to be screwed with the nut member 130 is provided on the other side of the spindle member 120, and a flange part 122 is provided between the rotation shaft 121 and the connection part 123 to extend in a radial direction to limit a movement range of the nut member 130.

The first screw portion 121a formed on the outer circumferential surface of the rotation shaft 121 is engaged with a second screw portion 131a to enable the nut member 130 to move forward and backward by the rotation of the spindle member 120.

The first screw portion 121a is provided in the form of a male screw protruding from the outer circumferential surface of the rotation shaft 121, and includes threads formed to protrude helically along the rotation shaft and grooves formed to be relatively recessed between the adjacent threads. In this case, a distance between the adjacent threads is called pitch.

A size of the pitch between the adjacent threads of the first screw portion 121a may be changed in a constant cycle along a rotation direction.

For example, the size of the pitch of the first screw portion 121a may increase and then decrease each time the spindle member 120 rotates once. In this case, the first screw portion 121a may include a first pitch between the threads provided on one side in a radial direction with respect to a central axis of the rotation shaft, and a second pitch between the threads provided on the other side in the radial direction. A size (X+α) of the second pitch is formed larger than a size (X) of the first pitch, and the first pitch is formed on the opposite side of the second pitch with respect to the central axis. In this case, a variable range α of the pitch size may be determined within a range in which the spindle member 120 is rotatable within the nut member 130.

However, an increase/decrease cycle of the size of the pitch of the first screw portion 121a may be variously changed, and in a case where the size of the pitch is changed to be repeated in the constant cycle, the cycle may be changed to a half rotation, two rotations, etc., and should be understood to be the same.

The nut member 130 is screwed with the spindle member 120 to convert the rotational force of the spindle member 120 into a linear motion to press or release the piston 30 toward the inner pad plate 11.

Specifically, the nut member 130 includes a rod 131 having the second screw portion 131a formed therein to be engaged with the first screw portion 121a, and a head 132 formed to extend radially from an end of the rod 131. The head 132 is provided with the anti-rotation part 132a formed on an outer circumferential surface thereof to have a shape corresponding to the anti-rotation surface (not shown) of the piston 30 to limit the rotation of the nut member 130.

The second screw portion 131a is provided in the form of a female screw having screw threads on an inner circumferential surface, and includes threads formed to protrude helically along the inner circumferential surface and grooves formed to be relatively recessed between the adjacent threads.

The size of the pitch between the adjacent threads of the second screw portion 131a may be formed to be constant.

Accordingly, as the size of the pitch of the second screw portion 131a is formed to be constant while the size of the pitch of the first screw portion 121a is cyclically changed, a load applied to the power generating part 110 connected to the spindle member 120 during rotation of the spindle member 120 may be cyclically changed. A detail thereof will be described later along with a graph of FIG. 8.

Hereinafter, a brake actuator 200 according to a second embodiment will be described. Here, spindle member 120 of FIG. 1 is replaced by spindle member 220. In the second embodiment, the same content as that of the first embodiment of the present disclosure will be omitted. Specifically, in the below descriptions, brake actuator 100 of FIG. 1 is referred to as brake actuator 200; power generating part 110 of FIG. 1 is referred to as power generating part 210; nut member 130 of FIG. 1 is referred to as nut member 230; rotation shaft 121 of FIG. 1 is referred to as rotation shaft 221; and first screw portion 121a of FIG. 1 is referred to as first screw portion 221a.

Figure 5:
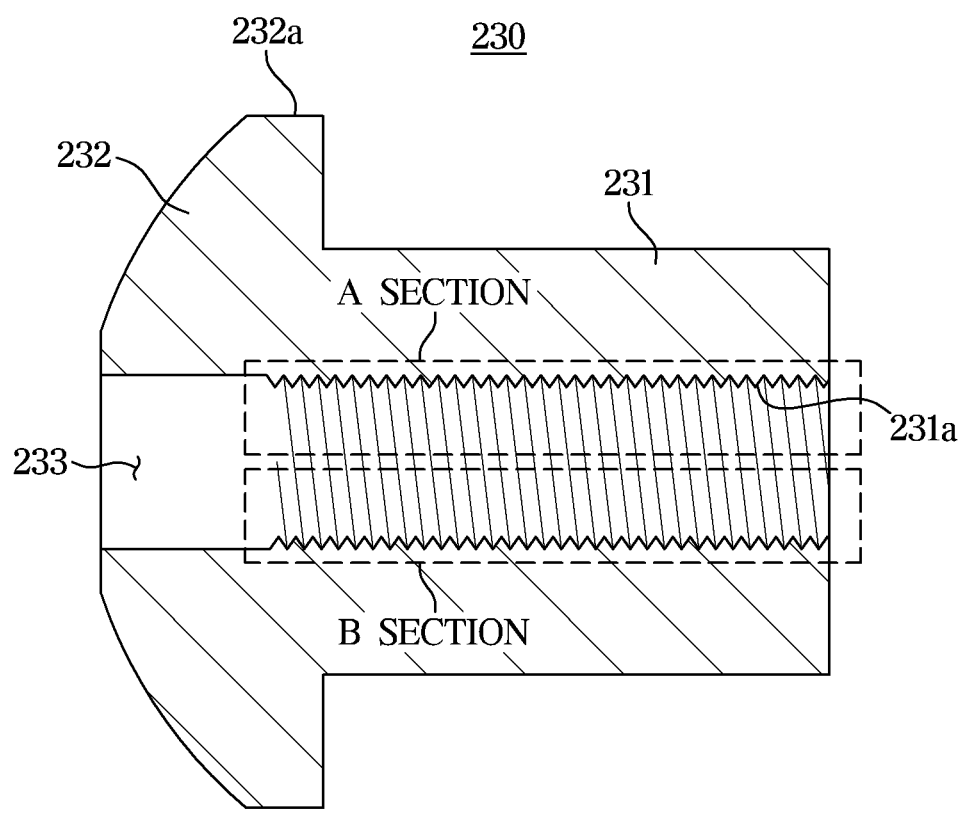
FIG. 5 is a cross-sectional view of a nut member according to a second embodiment of the present disclosure.
Figure 6:
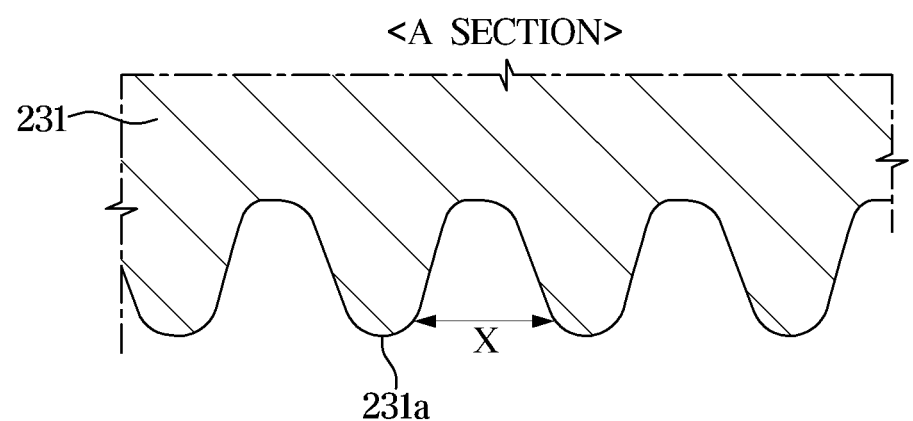
FIG. 6 is an enlarged cross-sectional view of part A in FIG. 5.
Figure 7:
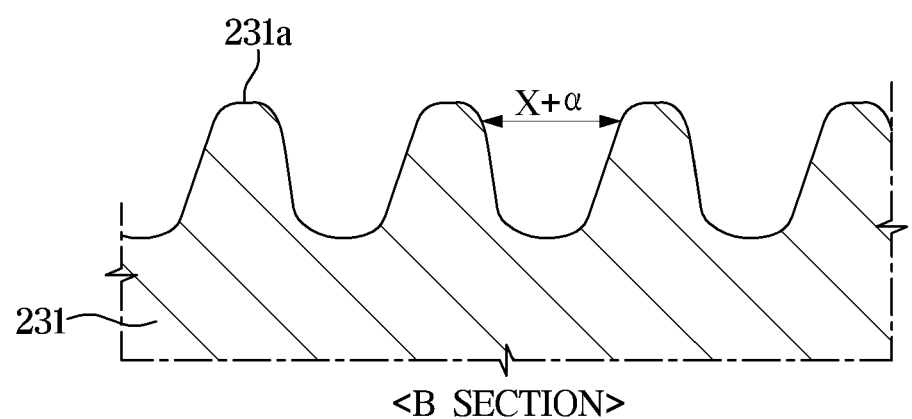
FIG. 7 is an enlarged cross-sectional view of part B in FIG. 5.

FIG. 5 is a cross-sectional view of a nut member 230 according to the second embodiment of the present disclosure, FIG. 6 is an enlarged cross-sectional view of part A in FIG. 5, and FIG. 7 is an enlarged cross-sectional view of part B in FIG. 5.

Referring to FIGS. 1 and 5 to 7, the actuator 200 includes a power generating part 210 provided to generate a rotational force by an electrical signal, a spindle member 220 provided to rotate by receiving power from the power generating part 210, and the nut member 230 provided to convert a rotational force of the spindle member 220 into a linear motion to press or release the piston 30 to the inner pad plate 11 side.

A rotation shaft 221 of the spindle member 220 has a first screw portion 221a formed on an outer circumferential surface thereof, and the first screw portion 221a is engaged with a second screw portion 231a so that the nut member 230 may be moved forward and backward by the rotation of the spindle member 220.

In this case, a size of the pitch between adjacent threads of the first screw portion 221a may be formed to be constant.

The nut member 230 includes a rod 231 having the second screw portion 231a formed therein to be engaged with the first screw portion 221a, and a head 232 formed to extend radially from an end of the rod 231. The nut member 230 includes a connection part 233 and a head 232. The head 232 is provided with an anti-rotation part 232a formed on an outer circumferential surface thereof to have a shape corresponding to the anti-rotation surface (not shown) of the piston 30 to limit the rotation of the nut member 230.

The second screw portion 231a is provided in the form of a female screw having screw threads on an inner circumferential surface, and includes threads formed to protrude helically along the inner circumferential surface and grooves formed to be relatively recessed between the adjacent threads.

In this case, a size of a pitch between the adjacent threads of the second screw portion 231a may be changed in a constant cycle along a rotation direction.

For example, the size of the pitch of the second screw portion 231a may increase and then decrease each time the spindle member 120 rotates once. In this case, the second screw portion 231a may include a first pitch between the threads provided on one side in a radial direction with respect to a central axis of the rotation shaft, and a second pitch between the threads provided on the other side in the radial direction. The size (X+α) of the second pitch is formed larger than the size (X) of the first pitch, and the first pitch is formed on the opposite side of the second pitch with respect to the central axis. In this case, the variable range α of the pitch size may be determined within a range in which the spindle member 220 is rotatable within the nut member 230.

However, an increase/decrease cycle of the size of the pitch of the second screw portion 231a may be variously changed, and in a case where the size of the pitch is changed to be repeated in the constant cycle, the cycle may be changed to a half rotation, two rotations, etc., and should be understood to be the same.

Accordingly, as the size of the pitch of the first screw portion 221a is formed to be constant while the size of the pitch of the second screw portion 231a is cyclically changed, when the spindle member 220 rotates, a load applied to the power generating part 210 may be cyclically changed. A detail thereof will be described later along with the graph of FIG. 8.

Hereinafter, the operation of the brake actuators according to the first and second embodiments of the present disclosure and a change in current of the power generating part according to the operation thereof will be described.

Figure 8:
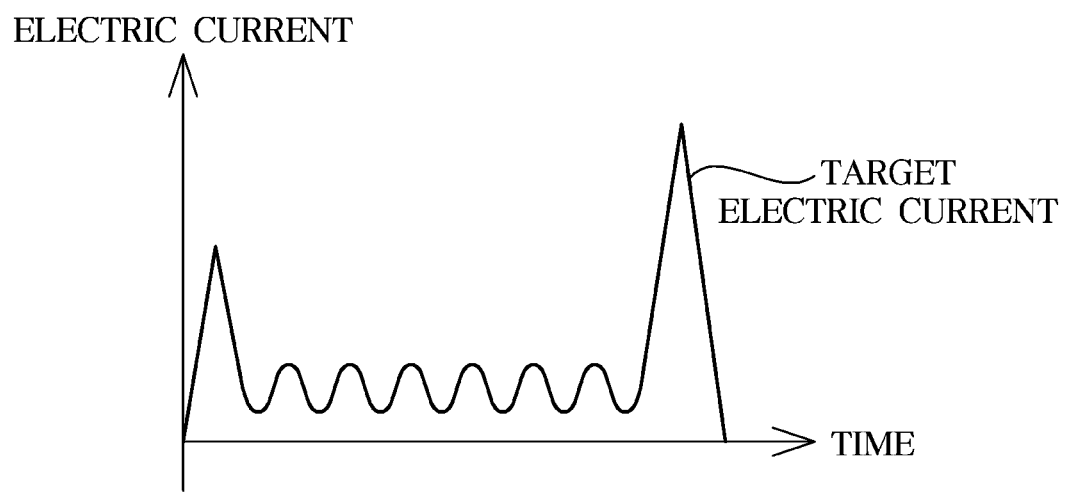
FIG. 8 is a graph illustrating a change in current during a braking operation of brake actuators according to the first and second embodiments of the present disclosure.

FIG. 8 is a graph illustrating a change in current during a braking operation of the brake actuators 100 and 200 according to the first and second embodiments of the present disclosure.

Referring to FIGS. 1 and 8, the electronic caliper brake 1 including the brake actuator 100 according to the first embodiment of the present disclosure generates a rotational force by transmitting an electrical signal to the power generating part 110 of the actuator 100 during braking operation. As the spindle member 120 receiving the rotational force rotates, the nut member 130 moves forward to press the piston 30. Accordingly, the piston 30 presses the pad plates 11 and 12 toward the disk D to perform the braking operation.

At this time, a change in current applied to the actuator 100 will be described with reference to the graph illustrated in FIG. 8.

According to the time sequence, it may be divided into a first section to a third section.

The first section is a section in which an initial load is generated in order to generated power to the actuator 100 in a stationary state. The second section is a section in which the spindle member 120 rotates and the nut member 130 moves forward, but a relatively small load is generated until just before friction occurs between the pad plates 11 and 12 and the disk D. The third section is a section in which friction is generated between the pad plates 11 and 12 and the disk D, so that the nut member 130 may no longer move forward and a large stationary load is generated on the actuator 100.

Specifically, the first section is a section in which the power generating part 110 is operated, and an instantaneous high current is required to operate the spindle member 120 in a stationary state.

The third section is a section in which the braking operation is completed because the pad plates 11 and 12 may no longer move forward by coming into close contact with the disk D. That is, the spindle member 120 may no longer rotate and the stationary load is generated, so that the current supplied to the power generating part 110 sharply increases. At this time, when the supplied current reaches a high current (target current) above a certain level, the current supply is stopped and the braking operation is completed.

The second section is a section before friction occurs between the pad plates and the disk by the piston 30 while the spindle member 120 rotates and the nut member 130 moves forward. The second section requires a small current because the load is relatively weak compared to the first section.

At this time, in the general actuator 100, the load generated on the actuator 100 in the second section is constant, so that the supply current is kept constant. Therefore, it is impossible to accurately calculate an actual rotational speed and rotation torque of the spindle member 220 in the second section without a separate sensor.

On the other hand, in the actuator 100 according to the first embodiment of the present disclosure, as the size of the pitch of the first screw portion 121a changes cyclically, when the spindle member 120 and the nut member 130 are engaged, the load generated on the actuator 100 is changed in the constant cycle. That is, the current in the actuator 100 is cyclically changed in the second section. Accordingly, it is possible to calculate the actual rotational speed (rpm) and rotational torque of the spindle member 120 until in the second section, the braking operation is started and completed.

In addition, the power generating part 110 of the actuator 100 may overheat depending on the operating time and strength, so that the temperature condition may change. A resistance value of the power generating part 110 changes depending on the temperature, and as a result, the rotational speed of the spindle member 120 may vary. In this case, the actuator 100 of the present disclosure may detect the rotational speed of the spindle member 120, so that the temperature of the power generating part 110 may be inversely calculated through data of the rotational speed depending on the temperature. Accordingly, the input current or torque required for the temperature condition may be precisely and efficiently controlled.

The description of the graph of FIG. 8 described above may be equally applied to the second embodiment. Specifically, the actuator 200 according to the second embodiment is provided such that the size of the pitch of the first screw portion 221a of the spindle member 220 is constant and the size of the pitch of the second screw portion 231a of the nut member 230 is cyclically changed. That is, the structure of the pitch formed in the spindle member 220 and the nut member 230 according to the second embodiment is opposite to the structure of the pitch formed in the spindle member 120 and the nut member 230 according to the first embodiment. Accordingly, it should be understood that the principle of generating a load in the second section is the same as that of the first embodiment.

Hereinafter, a brake actuator 300 according to the third embodiment will be described. Here, spindle member 120 of FIG. 1 is replaced by spindle member 320. The same content as that of the first embodiment of the present disclosure will be omitted. Specifically, in the below descriptions, brake actuator 100 of FIG. 1 is referred to as brake actuator 300; power generating part 110 of FIG. 1 is referred to as power generating part 310; nut member 130 of FIG. 1 is referred to as nut member 230; rod 131 of FIG. 1 is referred to as rod 331; head 132 of FIG. 1 is referred to as head 332; anti-rotation part 132a of FIG. 1 is referred to as anti-rotation part 332a; and second screw portion 131a of FIG. 1 is referred to as second screw portion 331a.

Figure 9:
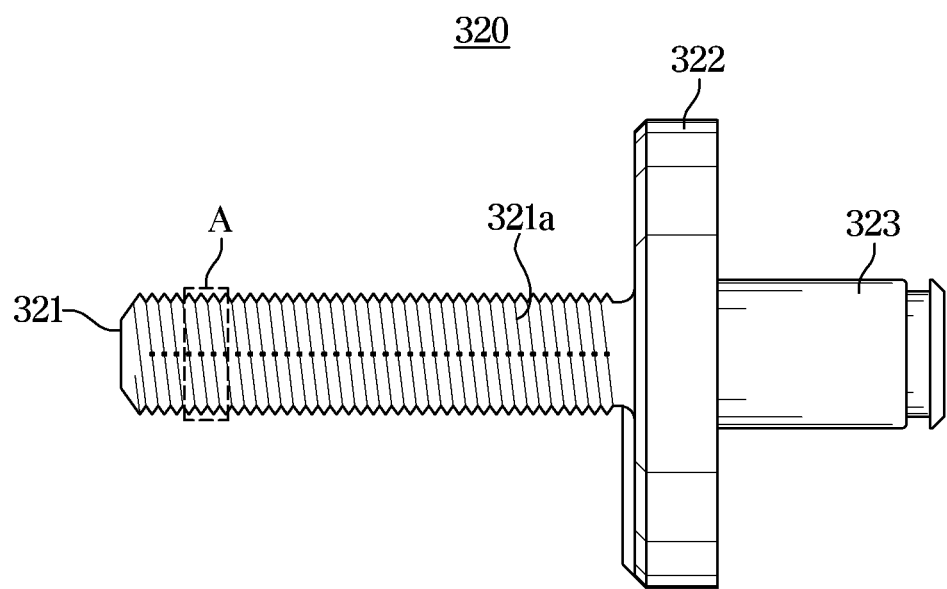
FIG. 9 is a schematic cross-sectional view of a spindle member according to a third embodiment of the present disclosure.
Figure 10:
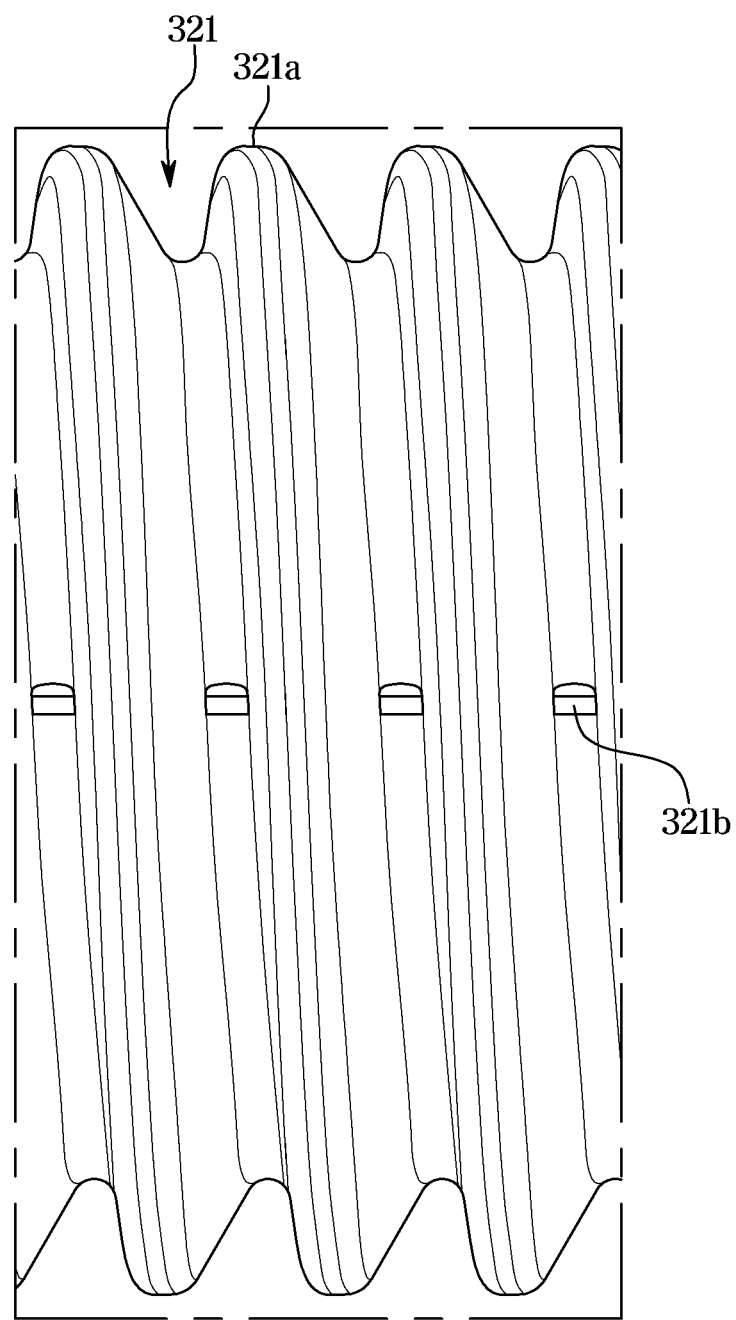
FIG. 10 is an enlarged cross-sectional view of part A in FIG. 9.

Referring to FIGS. 1, 9 and 10, the actuator 300 includes a power generating part 310 provided to generate a rotational force by an electrical signal, a spindle member 320 provided to rotate by receiving power from the power generating part 310, and a nut member 330 provided to convert a rotational force of the spindle member 320 into a linear motion to press or release the piston 30 to the inner pad plate 11 side.

Referring to FIGS. 1, 9 and 10, the actuator 300 includes a power generating part 310 provided to generate a rotational force by an electrical signal, a spindle member 320 having a connection part 323 is provided to rotate by receiving power from the power generating part 310, and a nut member 330 provided to convert a rotational force of the spindle member 320 into a linear motion to press or release the piston 30 to the inner pad plate 11 side.

A rotation shaft 321 of the spindle member 320 has a first screw portion 321a formed on an outer circumferential surface thereof, and the first screw portion 321a is engaged with a second screw portion 331a so that the nut member 330 may be moved forward and backward by the rotation of the spindle member 320.

The first screw portion 321a is provided in the form of a male screw formed on the outer circumferential surface of the rotation shaft, and includes threads formed to protrude helically along the rotation shaft and grooves formed to be relatively recessed between the adjacent threads.

A size of the pitch between the adjacent threads of the first screw portion 321a may be formed to be constant.

A plurality of protrusions 321b may be formed on the grooves of the first screw portion 321a in a constant cycle along a rotational direction.

For example, the protrusion 321b may be formed to protrude in a cycle of one rotation along the rotation direction.

As the spindle member 320 and the nut member 330 are engaged and rotated, the protrusion 321b may generate a load by being cyclically caught on the nut member 330. For example, the protrusion 321b may be caught on an inner circumferential surface of an end of a rod 331, or may be caught on a protrusion (not shown) provided on the groove of the second screw portion 331a of the nut member 330.

However, the position where the protrusion 321b is formed is not limited thereto, and as long as the protrusion 321b may generate a load cyclically as the spindle member 320 rotates, the protrusion 321b may be provided at various positions such as the thread and it should be understood in the same way as the above.

The nut member 330 is screwed with the spindle member 320 to convert the rotational force of the spindle member 320 into a linear motion to press or release the piston 30 toward the inner pad plate 11.

Specifically, the nut member 330 includes the rod 331 having the second screw portion 331a formed therein to be engaged with the first screw portion 321a, and a head 332 formed to extend radially from an end of the rod 331. The head 332 is provided with an anti-rotation part 332a formed on an outer circumferential surface thereof to have a shape corresponding to the anti-rotation surface (not shown) of the piston 30 to limit the rotation of the nut member 330.

The second screw portion 331a is provided in the form of a female screw having screw threads on an inner circumferential surface. The second screw portion 331a includes threads formed to protrude helically along the inner circumferential surface and grooves formed to be relatively recessed between the adjacent threads.

A size of a pitch between the adjacent threads of the second screw portion 331a may be formed to be constant.

At least one protrusion (not shown) may be formed on the groove of the second screw portion 331a to correspond to the protrusion of the first screw portion 321a described above.

Therefore, the protrusion 321b of the first screw portion 321a of the spindle member 320 may be caught on a protrusion (not shown) provided on the inner circumferential surface of the end of the rod 331 or the groove of the second screw portion 331a in the constant cycle. Accordingly, a load applied to the power generating part 310 during rotation of the spindle member 320 may be cyclically changed. A detail thereof will be described later along with a graph of FIG. 12.

Hereinafter, a brake actuator 400 according to a fourth embodiment will be described. The same content as that of the third embodiment of the present disclosure will be omitted.

Figure 11:
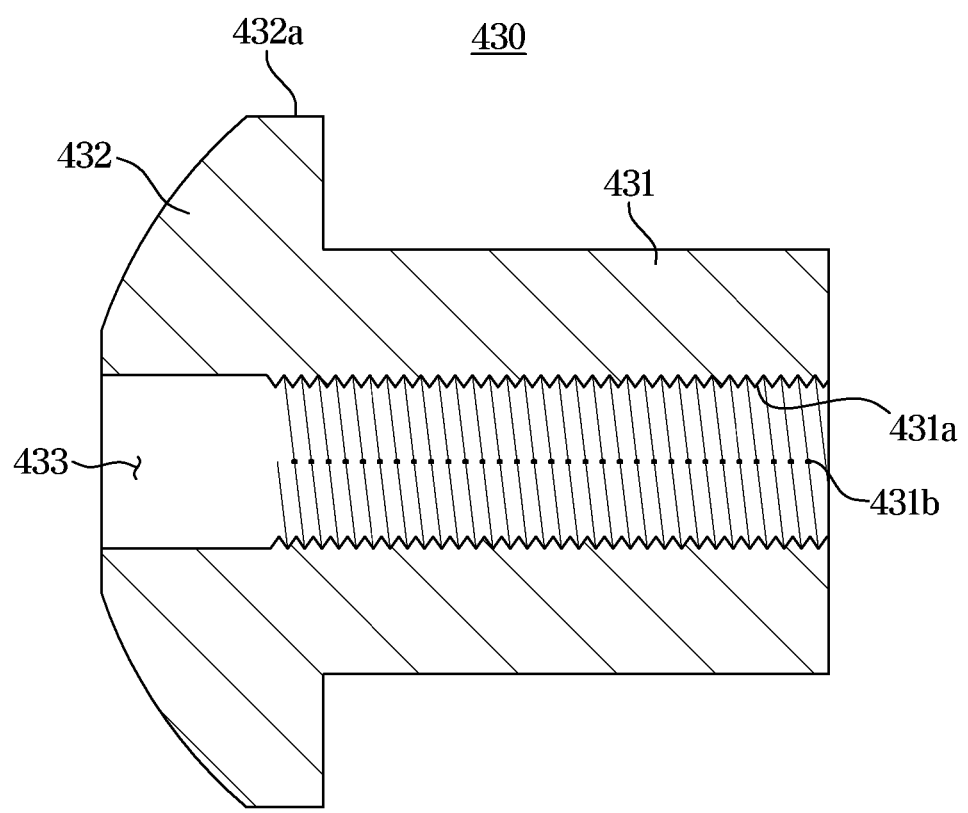
FIG. 11 is a cross-sectional view of a nut member according to a fourth embodiment of the present disclosure.

FIG. 11 is a cross-sectional view of a nut member according to the fourth embodiment of the present disclosure.

Referring to FIGS. 1 and 11, the actuator 400 includes a power generating part 410 provided to generate a rotational force by an electrical signal, a spindle member 420 provided to rotate by receiving power from the power generating part 410, and a nut member 430 provided to convert a rotational force of the spindle member 420 into a linear motion to press or release the piston 30 to the inner pad plate 11 side.

A rotation shaft 421 of the spindle member 420 has a first screw portion 421a formed on an outer circumferential surface thereof, and the first screw portion 421a is engaged with a second screw portion 431a so that the nut member 430 may be moved forward and backward by the rotation of the spindle member 420.

The first screw portion 421a is provided in the form of a male screw formed on the outer circumferential surface of the rotation shaft 421. The first screw portion 421a includes threads formed to protrude helically along the rotation shaft 421 and grooves formed to be relatively recessed between the adjacent threads.

At least one protrusion (not shown) may be formed on the groove of the first screw portion 421a to correspond to a protrusion of the second screw portion 431a, which will be described later.

The nut member 430 includes the rod 431 having the second screw portion 431a formed therein to be engaged with the first screw portion 421a of the spindle member 420, and a head 432 formed to extend radially from an end of the rod 431. The head 432 is provided with an anti-rotation part 432a formed on an outer circumferential surface thereof to have a shape corresponding to the anti-rotation surface (not shown) of the piston 30 to limit the rotation of the nut member 430.

The second screw portion 431a is provided in the form of a female screw having screw threads on an inner circumferential surface. The second screw portion 431a includes threads formed to protrude helically along the inner circumferential surface and grooves formed to be relatively recessed between the adjacent threads.

A size of a pitch between the adjacent threads of the second screw portion 431a may be formed to be constant.

In this case, a plurality of protrusions 431b may be formed on the grooves between the threads of the second screw portion 431a in a constant cycle along a rotational direction.

For example, the protrusion 431b may be formed to protrude in a cycle of one rotation along the rotation direction.

As the spindle member 420 and the nut member 430 are engaged and rotated, the protrusion 431b may generate a load by being cyclically caught on the spindle member 420. For example, the protrusion 431b may be caught on an end of the rotation shaft 421, or may be caught on the protrusion (not shown) provided on the groove of the first screw portion 421a.

However, the position where the protrusion 431b is formed is not limited thereto, and as long as the protrusion 431b may generate a load cyclically as the spindle member 420 rotates, the protrusion 431b may be provided at various positions such as the thread of the second screw portion 431a and it should be understood in the same way as the above.

Therefore, the protrusion 431b of the second screw portion 431a of the nut member 430 may be caught on a protrusion (not shown) provided on the end of the rotation shaft 421 or the groove of the first screw portion 421a in the constant cycle. Accordingly, a load applied to the power generating part 410 during rotation of the spindle member 420 may be cyclically changed. A detail thereof will be described later along with the graph of FIG. 12.

Hereinafter, the operation of the brake actuators according to the third and fourth embodiments of the present disclosure and a change in current of the power generating part depending on the operation will be described. A description of the content overlapping with the content described with reference to FIG. 8 will be omitted.

Figure 12:
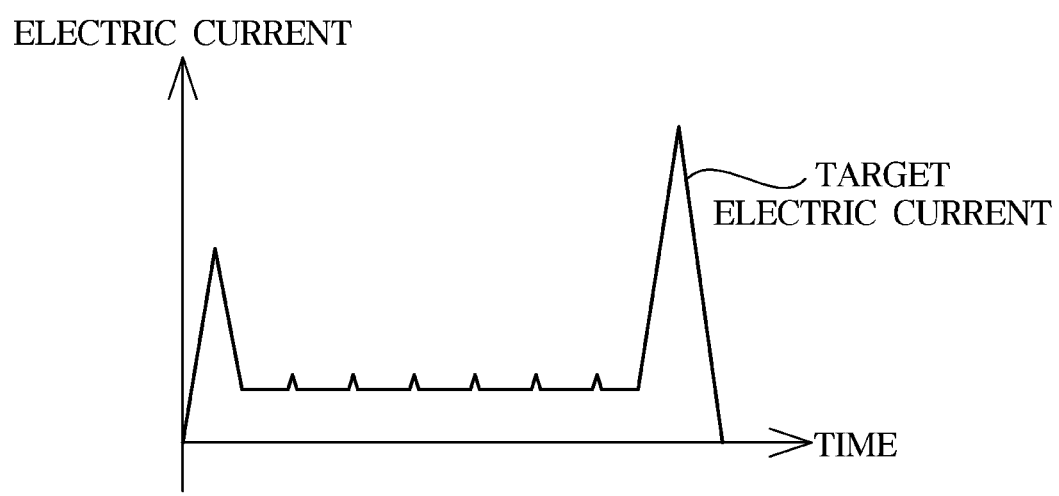
FIG. 12 is a graph illustrating a change in current during a braking operation of brake actuators according to the third and fourth embodiments of the present disclosure.

FIG. 12 is a graph illustrating a change in current during a braking operation of the brake actuators 300 and 400 according to the third and fourth embodiments of the present disclosure.

Referring to FIGS. 1 and 12, in the electronic caliper brake 1 including the brake actuator 100 according to the third embodiment of the present disclosure, because the operation in the first section and the third section during the braking operation overlaps with the description of the operation in FIG. 8, a description thereof will be omitted, and an operation of the second section in the graph of FIG. 12 will be described.

The second section is a section before friction occurs between the pad plates and the disk by the piston 30 while the spindle member 420 rotates and the nut member 430 moves forward. The second section requires a small current because the load is relatively weak compared to the first section.

At this time, in the general actuator 100, the load generated on the actuator 100 in the second section is constant, so that the current is kept constant. Therefore, it is impossible to accurately calculate an actual rotational speed and rotation torque of the spindle member 420 in the second section without a separate sensor.

On the other hand, in the actuator 300 according to the third embodiment of the present disclosure, a protrusion 321b is formed on the groove of the first screw portion 321a in a constant cycle. Accordingly, when the spindle member 320 and the nut member 330 are engaged, the load generated on the actuator 300 is changed in the constant cycle. That is, the current in the actuator 300 is changed in the second section in the constant cycle. Accordingly, it is possible to calculate the actual rotational speed (rpm) and rotational torque of the spindle member 320 before in the second section, the braking operation is started and then completed.

In addition, the power generating part 310 of the actuator 300 may overheat depending on the operating time and strength, so that the temperature condition may change. A resistance value of the power generating part 310 changes depending on the temperature, and as a result, the rotational speed of the spindle member 320 may vary. In this case, the actuator 300 of the present disclosure may detect the rotational speed of the spindle member 320, so that the temperature of the power generating part 310 may be inversely calculated through data of the rotational speed depending on the temperature. Accordingly, the input current or torque required for the temperature condition may be precisely and efficiently controlled.

The description of the graph of FIG. 11 described above may be equally applied to the fourth embodiment. Specifically, in the actuator 400 of the fourth embodiment, the protrusion 431b is formed in a constant cycle in the groove of the second screw portion 431a of the nut member 430, and the principle of generating a load in the second section is the same, and thus it should be understood in the same way as the above-described third embodiment.

The foregoing has illustrated and described specific embodiments, but, it should be understood by those of skilled in the art that the disclosure is not limited to the above-described embodiments, and various changes and modifications may be made without departing from the technical idea of the disclosure described in the following claims.

The invention claimed is:

1. A brake actuator configured to press or release a piston toward a brake pad and be controlled by an electrical signal, the brake actuator comprising:
   a power generating part provided to generate power by an electrical signal;
   a spindle member provided to rotate by receiving power from the power generating part and having a first screw portion formed on an outer circumferential surface; and
   a nut member provided to press or release the piston, the nut member having a second screw portion formed on an inner circumferential surface to be engaged with the first screw portion,
   wherein a size of a pitch between adjacent threads of the second screw portion repeatedly increases and decreases in a constant cycle along a rotation direction such that a load applied to the power generation part is cyclically changed during rotation of the spindle member.

2. The brake actuator according to claim 1, wherein the size of the pitch between the adjacent threads of the second screw portion repeatedly increases and decreases in a cycle of one rotation along the rotation direction.

3. The brake actuator according to claim 1, wherein the second screw portion comprises a first pitch between the adjacent threads provided on a first side with respect to a central axis of the nut member and a second pitch between the adjacent threads provided on a second side with respect to the central axis of the nut member, and a size (X+α) of the second pitch is larger than a size (X) of the first pitch.

4. The brake actuator according to claim 1, wherein a size of a pitch between adjacent threads of the first screw portion is constant.

5. The brake actuator according to claim 1, wherein the nut member comprises:
 a rod having the second screw portion formed therein, and
 a head formed to extend radially from the rod and provided with an anti-rotation part corresponding to an anti-rotation surface of the piston.

6. A brake actuator configured to press or release a piston toward a brake pad and be controlled by an electrical signal, the brake actuator comprising:
 a power generating part provided to generate power by an electrical signal;
 a spindle member provided to rotate by receiving power from the power generating part and having a first screw portion formed on an outer circumferential surface; and
 a nut member provided to press or release the piston, the nut member having a second screw portion formed on an inner circumferential surface to be engaged with the first screw portion,
 wherein the second screw portion comprises a plurality of protrusions that protrude from grooves that are recessed between adjacent threads of the second screw portion in a constant cycle along a rotation direction such that a load applied to the power generation part is cyclically changed during rotation of the spindle member.

7. The brake actuator according to claim 6, wherein the plurality of protrusions protrude from the grooves in a cycle of one rotation along the rotation direction.

8. The brake actuator according to claim 6, wherein a size of a pitch between the adjacent threads of the first screw portion is constant.

9. The brake actuator according to claim 6, wherein the nut member comprises:
 a rod having the second screw portion formed therein, and
 a head formed to extend radially from the rod and provided with an anti-rotation part corresponding to an anti-rotation surface of the piston.

* * * * *